(12) United States Patent
Yosef et al.

(10) Patent No.: US 11,163,667 B2
(45) Date of Patent: Nov. 2, 2021

(54) METHOD AND APPARATUS FOR ERROR TICKET MANAGEMENT

(71) Applicant: EMC IP Holding Company LLC, Hopkinton, MA (US)

(72) Inventors: Ilan Yosef, Petach Tikva (IL); Shay Goldshmidt, Hertzelia (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/834,217

(22) Filed: Mar. 30, 2020

(65) Prior Publication Data

US 2021/0303445 A1 Sep. 30, 2021

(51) Int. Cl.
*G06F 11/00* (2006.01)
*G06F 11/36* (2006.01)
*G06F 16/182* (2019.01)

(52) U.S. Cl.
CPC ...... *G06F 11/3664* (2013.01); *G06F 11/3688* (2013.01); *G06F 16/182* (2019.01)

(58) Field of Classification Search
CPC .......................... G06F 11/3664; G06F 11/3688
See application file for complete search history.

(56) References Cited

U.S. PATENT DOCUMENTS

| | | | | |
|---|---|---|---|---|
| 7,607,040 B2* | 10/2009 | Barlow | ............... | G06F 11/2028 714/10 |
| 8,145,949 B2* | 3/2012 | Silver | ................. | G06F 11/3688 714/26 |
| 8,732,516 B2* | 5/2014 | Adams, Jr. | .............. | H04L 43/50 714/4.1 |
| 8,813,039 B2* | 8/2014 | Maczuba | ........... | G06F 11/3692 717/128 |
| 9,032,259 B1* | 5/2015 | Hood | .................. | G06F 11/3692 714/57 |
| 10,353,804 B1* | 7/2019 | Kandru | ............... | G06F 11/3616 |
| 10,437,702 B2* | 10/2019 | Kalech | ................ | G06F 11/3604 |
| 10,678,677 B1* | 6/2020 | Kuris | ........................ | G06F 8/41 |
| 10,754,720 B2* | 8/2020 | Mahindru | ............ | G06F 11/008 |
| 2003/0149919 A1* | 8/2003 | Greenwald | ......... | G06F 11/2257 714/43 |
| 2014/0229787 A1* | 8/2014 | Allen | .................. | G06F 11/0709 714/748 |
| 2015/0288557 A1* | 10/2015 | Gates | .................. | G06F 11/3082 714/37 |
| 2016/0274948 A1* | 9/2016 | Kelly | .................... | G06F 9/5061 |
| 2017/0140315 A1* | 5/2017 | Cao | .................. | G06Q 10/06311 |
| 2017/0364426 A1* | 12/2017 | Blea | ............. | G06F 11/2097 |
| 2020/0097348 A1* | 3/2020 | Mahindru | ........... | H04L 43/0817 |
| 2020/0257612 A1* | 8/2020 | Lang | ................... | G06F 11/3612 |

\* cited by examiner

*Primary Examiner* — Elmira Mehrmanesh

(74) *Attorney, Agent, or Firm* — Daly, Crowley, Mofford & Durkee, LLP

(57) ABSTRACT

A method is provided comprising: storing one or more tickets in a ticket database, each of the tickets being associated with a corresponding test system, and each of the tickets being associated with an error that is generated as a result of executing one of a plurality of tests on the ticket's corresponding test system; executing a reclamation agent that is configured to: retrieve a plurality of tickets from a ticket database, detect if each of the tickets satisfies a predetermined condition, and return the ticket's corresponding test system to a pool of available test systems when the predetermined condition is satisfied by the ticket.

17 Claims, 9 Drawing Sheets

METHOD AND APPARATUS FOR ERROR TICKET MANAGEMENT

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided comprising: storing one or more tickets in a ticket database, each of the tickets being associated with a corresponding test system, and each of the tickets being associated with an error that is generated as a result of executing one of a plurality of tests on the ticket's corresponding test system; executing a reclamation agent that is configured to: retrieve a plurality of tickets from a ticket database, detect if each of the tickets satisfies a predetermined condition, and return the ticket's corresponding test system to a pool of available test systems when the predetermined condition is satisfied by the ticket.

According to aspects of the disclosure, a system is provided, comprising: a memory; and at least one processor operatively coupled to the memory, the at least one processor being configured to perform the operations of: storing one or more tickets in a ticket database, each of the tickets being associated with a corresponding test system, and each of the tickets being associated with an error that is generated as a result of executing one of a plurality of tests on the ticket's corresponding test system; and executing a reclamation agent that is configured to: retrieve a plurality of tickets from a ticket database, detect if each of the tickets satisfies a predetermined condition, and return the ticket's corresponding test system to a pool of available test systems when the predetermined condition is satisfied by the ticket.

According to aspects of the disclosure, a non-transitory computer-readable medium is provided that stores one or more processor-executable instructions, which, when executed by at least one processor, cause the at least one processor to perform the operations of: storing one or more tickets in a ticket database, each of the tickets being associated with a corresponding test system, and each of the tickets being associated with an error that is generated as a result of executing one of a plurality of tests on the ticket's corresponding test system; executing a reclamation agent that is configured to: retrieve a plurality of tickets from a ticket database, detect if each of the tickets satisfies a predetermined condition, and return the ticket's corresponding test system to a pool of available test systems when the predetermined condition is satisfied by the ticket.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
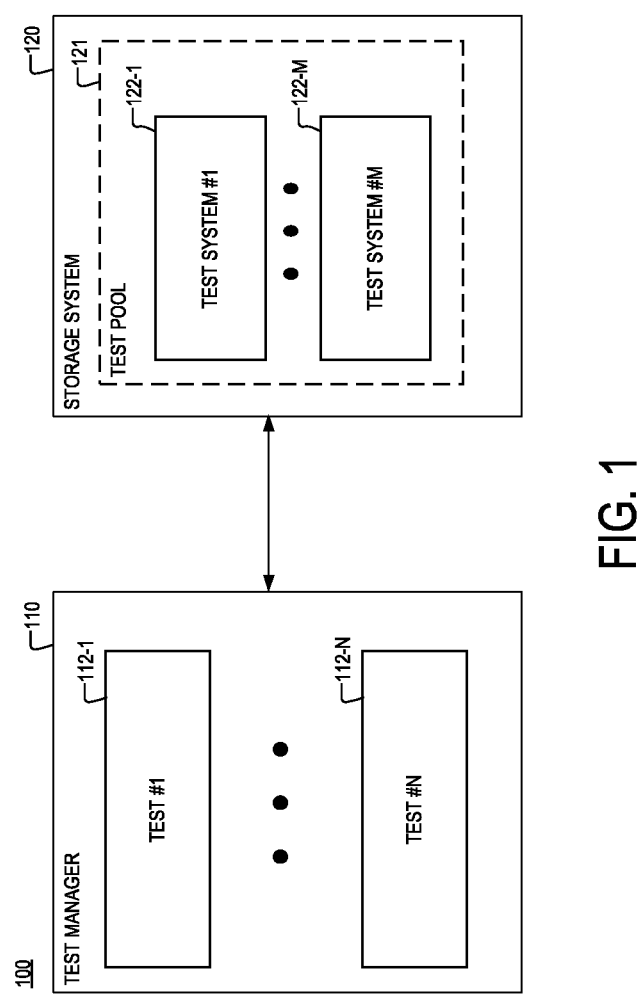
FIG. 1 is a diagram of an example of a system, according to aspects of the disclosure.

FIG. 1 is a schematic diagram of an example of a system 100, according to aspects of the disclosure. The system 100 may include a test manager 110 and a storage system 120. The test manager 110 may include one or more computing devices that are configured to execute a set of tests 112. The tests 112 may be executed by using a pool 121 of available test systems 122 that is provided within the storage system 120. Each of the tests 112 may be executed on a respective one of the test systems 122, and it may be arranged to validate a different aspect of the operation of that test system (and/or software that is executed on the test system). According to the present example, each of the test systems 122 is a virtual appliance that is executed a computing device, such as a computing device 600 (see FIG. 6). According to the present example, any two of the test systems 122 may be executed on the same computing device or on different computing devices. The tests 112 may include any suitable type of test that is customarily used to validate software that is part of the storage system 120. As can be readily appreciated, the tests 112 may be executed as part of the development cycle of the storage system 120.

According to the example of FIG. 1, the storage system 120 may include any suitable type of distributed storage system, such as a content-addressed storage system or a location-addressed storage system, for example. According to the example of FIG. 1, the set of tests 112 may include tests 112-1 through 112-N, where N is a positive integer greater than 1. According to the example of FIG. 1, the pool of test systems 122 may include test systems 122-1 through 122-M, where M is a positive integer greater than 1 and smaller than N. According to the example of FIG. 1, the operation of the test manager 110 is described in the context of testing the software of a storage system. However, alternative implementations are possible in which the test manager 110 is used to test any suitable type of software (and/or hardware). In this regard, it will be understood that the concepts and principles that are presented throughout the disclosure can be applied to the testing of any type of software and are in no way limited to testing the operation of storage systems only.

Figure 2A:
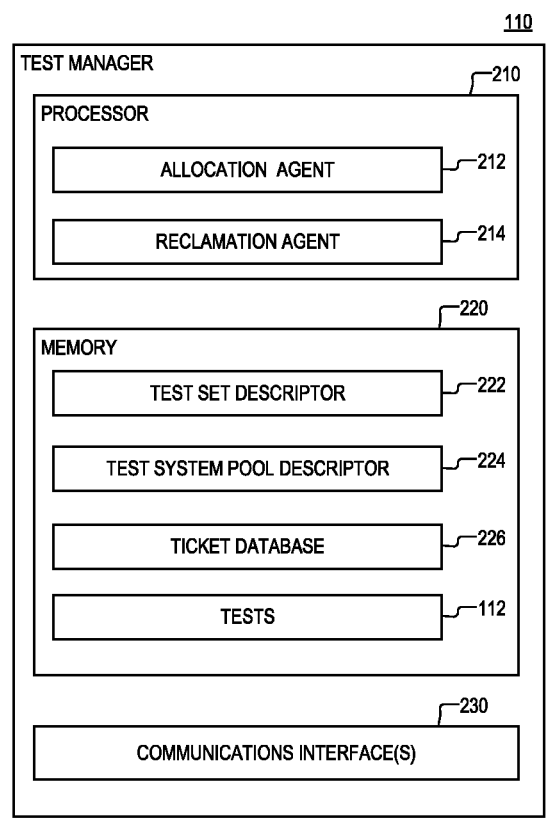
FIG. 2A is a diagram of an example of a test manager, according to aspects of the disclosure.

FIG. 2 is a schematic diagram of the test manager 110, in accordance with one particular implementation. As illustrated, the test manager 110 may include a processor 210 that is operatively coupled to a memory 220, and communications interface(s) 230. The processor 210 may include one or more of a general-purpose processor (e.g., an x86 processor, an ARM-based processor, a MIPS processor), an application-specific integrated circuit (ASIC), a Field-Programmable Gate Array (FPGA), and/or any other suitable type of processing circuitry. The memory 220 may include any suitable type of volatile and/or non-volatile memory. For example, in some implementations, the memory 220 may include one or more of a random-access memory (RAM), a read-only memory (ROM), a solid-state drive (SSD), electrically erasable programmable read-only memory (EEPROM), and/or any other suitable type of memory. The communications interface(s) 230 may include one or more of a Bluetooth interface, an InfiniBand interface, an Ethernet interface, a WiFi interface, a ZigBee interface, a Universal Serial Bus (USB) interface, and/or any other suitable type of interface.

The memory 220 may be configured to store a test set descriptor 222, a test system pool descriptor 224, a ticket database 226, and the set of tests 112, which is shown in FIG. 1. The test set descriptor 222 may include a data structure that identifies a plurality of tests 112 that are available for execution on the storage system 120. More particularly, the test set descriptor 222 may include a plurality of identifiers, wherein each identifier corresponds to a different test 112 that is desired to be executed on the storage system 120. The pool descriptor 224 may include a data structure that identifies one or more test systems 122 that are available to run the plurality of tests 112. More particularly, the pool descriptor 224 may include a plurality of identifiers, wherein each identifier corresponds to a different one of the test systems 122. The ticket database 226 may include one or more data structures that store a plurality of tickets. The ticket database 226 is discussed further below with respect to FIGS. 2B-C.

The processor 210 may be configured to execute an allocation agent 212 and a reclamation agent 214. The allocation agent may include one or more processor-executable instructions that are arranged to allocate respective ones of the test systems 122 for the execution of the tests 112. In other words, the allocation agent 212 may be tasked with executing the plurality of tests 112 on the test systems 122. The allocation agent 212 may execute any given one of the tests 112 by: (i) selecting a test system 122 from the pool 121, (ii) removing the selected test system 122 from the pool 121, and (iii) causing the selected test system 122 to execute the given test 112. As discussed further below, the selected test system 122 may become unavailable to execute other tests 112 until the selected test system 122 is returned to the pool 121 of available test systems.

In some implementations, removing the given test system 122 from the pool 121 may include taking any action that causes the selected test system 122 to become unavailable for executing other tests 112. For example, removing the selected test system 122 from the pool 121 may include removing an identifier corresponding to the selected test system 122 from the pool descriptor 224. As another example, removing the selected test system 122, from the pool 121, may include modifying the pool descriptor 224 to indicate that the selected test system 122 is currently in use or otherwise unavailable to execute other tests 112. It will be understood that the present disclosure is not limited to any method for removing test systems 122 from the pool 121.

In some implementations returning the selected test system 122 to the pool 121 may include taking any action that causes the given test system 122 to again become available for executing other tests 112. For example, returning the selected test system 122 to the pool 121 may include adding, to the pool descriptor 224, an identifier corresponding to the selected test system 122. As another example, returning the selected test system 122, to the pool 121 may include modifying the pool descriptor 224 to indicate that the selected test system 122 is currently available to execute additional tests 112. It will be understood that the present disclosure is not limited to any method for returning test systems 122 to the pool 121.

When an error is generated during the execution of the given test 112, the allocation agent 212 may generate a ticket 250 (e.g., see FIG. 2C) corresponding to the selected test system 122, and add the ticket to the ticket database 226. The ticket may include an identifier corresponding to the error, as well as other information concerning the error. The ticket may be used, by software developers, to keep track of the error, and it can be retrieved from the ticket database, when the error is being debugged. After the ticket is added to the ticket database 226, the selected test system 122 may remain outside of the pool 121 for a prolonged period of time until the selected test system 122 is returned to the pool 121 by the reclamation agent 214. As can be readily appreciated, the selected test system 122 may remain outside of the pool 121 to give software developers the opportunity to examine the test system 122 when the error is being debugged.

When no errors are generated during the execution of the given test 112 (on the selected test system 122), the allocation agent 212 may return the selected test system 122 to the pool 121 right away following the completion of the given test 112. In other words, the selected test system 122 may be returned to the pool if no errors are generated during the execution of the given test 112, whereas, if an error is generated during the execution of the given test 112, the selected test system 122 may remain outside of the pool 121 for a prolonged time period. As can be readily appreciated, if the test systems 122 are not being returned to the pool 121 promptly, the pool 121 may become depleted of tests system 122, and this may reduce the speed and efficiency at which the tests 112 are executed.

The reclamation agent 214 may include one or more processor-executable instructions that are arranged to return test systems 122 to the pool 121 in order to prevent the pool 121 from becoming depleted. The reclamation agent 214 may be executed periodically (e.g., every day or every 12 hours, etc.). In operation, the reclamation agent 214 may retrieve a plurality of tickets 250 from the ticket database 226. The reclamation agent 214 may then detect whether each of the tickets 250 satisfies a predetermined condition. If the predetermined condition is satisfied by any of the tickets 250, the reclamation agent may identify a test system 122 that is associated with that ticket 250. And finally, the reclamation agent 214 may return the identified test system 122 to the pool 121. By contrast, if the predetermined condition is not satisfied by any given one of the tickets 250, the reclamation agent 214 may allow the test system 122 (associated with the given ticket 250) to remain outside of the pool 121, until at least the next execution of the reclamation agent 214. In other words, the reclamation agent 214 may be configured to periodically scan the ticket database 226, identify tickets 250 that satisfy a predetermined condition, identify test systems 122 corresponding to the tickets 250 that satisfy the predetermined condition, and return the identified test systems 122 to the pool 121.

The reclamation agent 214, as noted above, may return a test system 122 that is associated with a ticket 250, when a predetermined condition is satisfied by the ticket 250. In some implementations, the predetermined condition may be satisfied when the ticket 250 is resolved. For example, a ticket 250 may be considered resolved when the ticket includes metadata indicating that the ticket has been resolved. Additionally or alternatively, in some implementations, the predetermined condition may be satisfied when the ticket 250 has been stored in the ticket database 226 for longer than a predetermined time period (e.g., for longer than 3 days). Additionally or alternatively, in some implementations, the predetermined condition may be specified by the user (e.g., via keyboard input or mouse input that is received by the reclamation agent 214). In this regard, it will be understood that the present disclosure is not limited to any specific type of predetermined condition for deciding whether to return a test system 122 back to the pool 121.

The reclamation agent 214 may be used by quality-assurance (QA) personnel as part of testing that is performed on the storage system 120. Periodically executing the reclamation agent 214 is advantageous because it may increase the availability of test systems 122 in the pool 121, and it may prevent the pool 121 from becoming depleted. According to the present disclosure, it has been observed that deploying the reclamation agent 214 on test manager 110 can increase the utilization of available test systems by 50%. According to the present disclosure, it has been further observed that deploying the reclamation agent 214 on the test manager 110 can increase the coverage achieved by QA professionals by 50%. In other words, deploying the reclamation agent 214 in a software testing environment is advantageous because it can increase the efficiency at which software testing is performed and improve the productivity of QA personnel that carries out the testing.

Figure 2B:
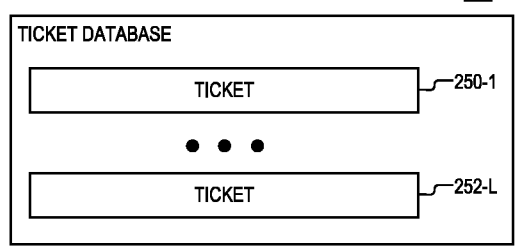
FIG. 2B is a diagram of an example of a ticket database, according to aspects of the disclosure.

FIG. 2B is a diagram of the ticket database 226, according to aspects of the disclosure. As illustrated, the ticket database 226 may include a plurality of tickets 250-1 through 250-L, where 1<=L<=M. Each of the tickets 250 in the ticket database 226 may be associated with a different test 112 and a different test system 122. In other words, each of the tickets 250 may be associated with a different test system 122 that is currently removed from the pool 121 and which is waiting to be returned to the pool 121.

Figure 2C:
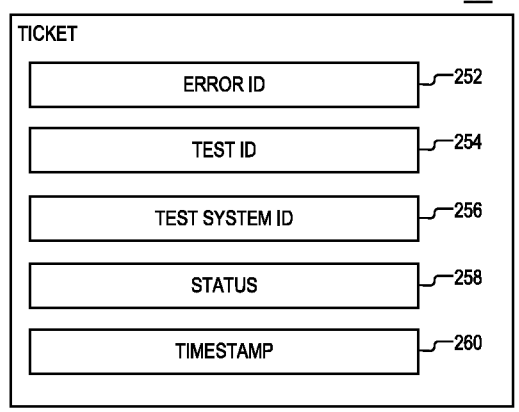
FIG. 2C is a diagram of an example of a ticket, according to aspects of the disclosure.

FIG. 2C is a diagram of an example of a ticket 250, according to aspects of the disclosure. As the numbering suggests, the ticket 250 may be the same or similar to any of the tickets 250-1 through 250-L, which are discussed above with respect to FIG. 2B. As illustrated in FIG. 2C, the ticket 250 may be a data structure (e.g., a file, a database entry, etc.) that includes an error ID field 252, a test ID field 254, a test system ID field 256, a status field 258, and a timestamp field 260. The error II) field 252 may contain an identifier corresponding to an error that is associated with the ticket 250. The test ID field 254 may contain an identifier corresponding to a test 112 that is associated with the ticket 250. The test associated with the ticket may be one whose execution resulted in the error (identified in field 252) being generated. The test system ID field 256 may identify a test system 122 that is associated with the ticket. The test system 122 that is associated with the ticket 250 may be a test system 122 on which the test (identified in the field 254) was executed when the error (identified in the field 252) was generated. The status field 252 may include an identifier indicating whether the ticket 250 has been resolved. When the status field 258 has a first value, this may indicate that the ticket 250 has been resolved. When the status field 258 has a second value, this may indicate that the ticket has not been resolved yet. The timestamp field 260 may indicate the time when the ticket 250 has been added to a ticket database, such as the ticket database 226. FIG. 2C is provided as an example only. At least some of the fields 252-260 may be omitted from the ticket, and/or additional fields may be provided in the ticket. For example, although not shown, the ticket 250 may include a field containing additional information about the error associated with the ticket (i.e., the error identified by the field 252). Such information can be used for the purpose of debugging the error and/or any other suitable purpose.

Figure 3:
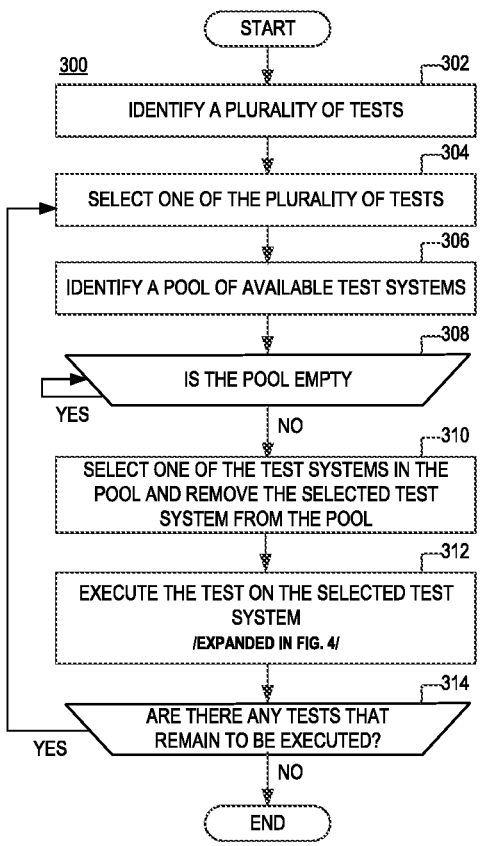
FIG. 3 is a flowchart of an example of a process, according to aspects of the disclosure.

FIG. 3 is a flowchart of an example of a process 300 that is performed by the allocation agent 212. Although in the example of FIG. 3 the process 300 is performed by the allocation agent 212, it will be understood that alternative implementations are possible in which the process 300 (or portions thereof) is performed by any suitable component of the test manager 110. Stated succinctly, the present disclosure is not limited to any specific implementation of the process 3).

At step 302, the allocation agent 212 identifies the plurality of tests 112. In some implementations, identifying the plurality of tests 112 may include retrieving, from the memory 220, the test set descriptor 222. At step 304, the allocation agent 212 selects one of the plurality of tests 112. At step 306, the allocation agent 212 identifies the pool 121 of available test systems 122. In some implementations, identifying the pool 121 may include retrieving, from the memory 220, the pool descriptor 224. At step 308, the allocation agent 212 determines whether the pool 121 is empty. If the pool is empty, the allocation agent 212 waits until one of the test systems 122 is returned to the pool 121. Otherwise, if the pool is non-empty, the process 300 proceeds to step 310. At step 310, the allocation agent 212 selects one of the test systems 122 from the pool 121. At step 312, the allocation agent 212 executes the test 112 (selected at step 304) on the test system 122 (that is selected at step 310). The manner in which step 312 is performed is discussed further below with respect to FIG. 4. At step 314, the location agent 212 determines whether each of the tests 112 (identified at step 302) has been executed. If there are tests 112 that remain to be executed, the process 300 returns to step 304, and another one of the tests 112 is selected. Otherwise, if no more tests 112 remain to be executed, the process 300 ends.

Figure 4:
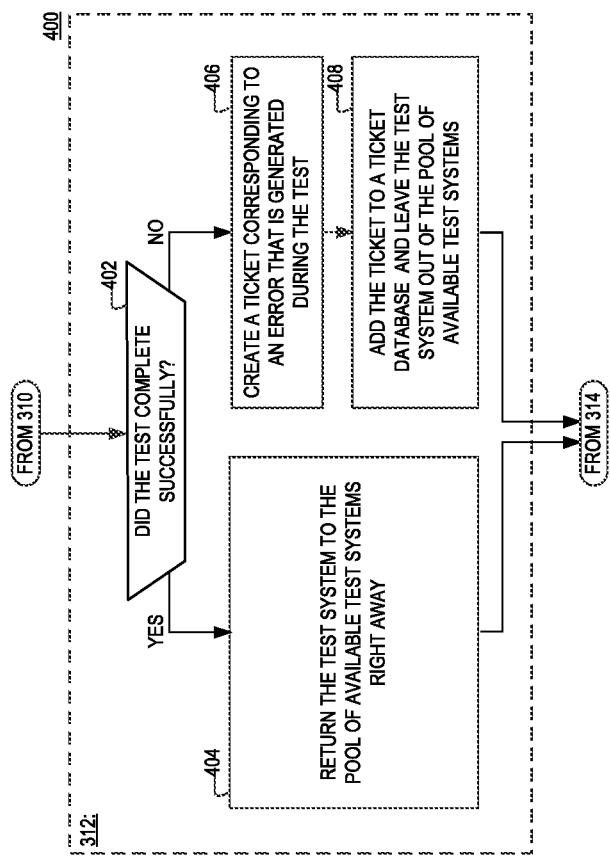
FIG. 4 is a flowchart of an example of a process, according to aspects of the disclosure.

FIG. 4 is a flowchart of an example of a process 400 for executing a test 112 on a selected test system 122, as specified by step 312 of the process 300. At step 402, the allocation agent 212 determines whether the test (selected at step 304) has completed successfully. According to the present disclosure, the test 112 (selected at step 304) has completed successfully when no errors are generated during the execution of the test 112. Otherwise, if one or more errors are generated during the execution of the test 112, the test 112 is considered, to have not completed successfully. If the test 212 has executed without errors, the process 400 proceeds to step 404. Otherwise, if at least one error is generated during the execution of the test 112, the process 400 proceeds to step 406. At step 404, the allocation agent 212 returns the test system 122 (selected at step 310) back to the pool 121 of available test systems. At step 406, the allocation agent 212 generates a ticket 250 that is associated with: (i) the test system (selected at step 310), (ii) the test (selected at step 304), and (iii) an error that is generated as a result of executing the test. At step 408, the allocation agent 212 stores the generated ticket 250 in the ticket database 226 and leaves the test system 122 (selected at step 310) out of the pool 121 of available test systems. The test system 122 (selected at step 310) may remain out of the pool 121 until it is returned by (or with the help of) the reclamation agent 214.

Figure 5A:
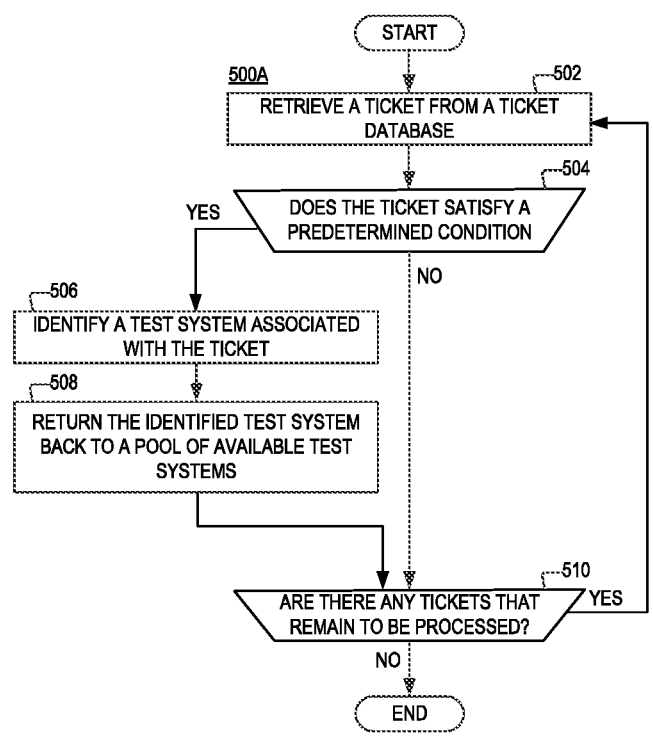
FIG. 5A is a flowchart of an example of a process that is performed by a reclamation agent, according to aspects of the disclosure.

FIG. 5A is a flowchart of an example of a process 500A that is performed by the reclamation agent 214. Although in the example of FIG. 5A, the process 500A is performed by the reclamation agent 214, it will be understood that alternative implementations are possible in which the process 500A (or portions thereof) is performed by any suitable component of the test manager 110. Stated succinctly, the present disclosure is not limited to any specific implementation of the process 500A.

At step 502, the reclamation agent 214 retrieves a ticket 250 from the ticket database 226. As noted above, the retrieved ticket 250 may be associated with: (i) a particular test 112, (ii) an error that is generated when the particular test 112 is executed, and (iii) a test system 122 on which the test is executed when the error is generated. At step 504, the reclamation agent detects whether the ticket 250 satisfies a predetermined condition. In some implementations, the ticket 250 may satisfy the predetermined condition if the ticket 250 has been resolved. Additionally or alternatively, in some implementations, the ticket 250 may satisfy the predetermined condition if the ticket 250 has been stored in the database for longer than a predetermined period of time (e.g., 3 days). Additionally or alternatively, in some implementations, the ticket 250 may satisfy the predetermined condition if the ticket 250 has been resolved or if the ticket 250 has been stored for longer than a predetermined period of time in the ticket database 226. At step 506, the reclamation agent 214 identifies the test system 122 that is associated with the ticket 250. At step 508, the reclamation agent 214 returns the identified test system 122 back to the pool 121 of available test systems. At step 510, the reclamation agent 214 detects whether there are any more tickets 250 in the ticket database 226 that remain to be processed. If there are more tickets 250 stored in the ticket database 226 that remain to be processed, the process 500A returns to step 502. Otherwise, if no tickets remain to be processed, the execution of the process 500A ends. In some implementations, the reclamation agent 214 may examine all tickets 250 that are stored in the ticket database 226. Additionally or alternatively, in some implementations, the reclamation agent may remove from the ticket database 226 any tickets 250 that satisfy the predetermined condition.

Figure 5B:
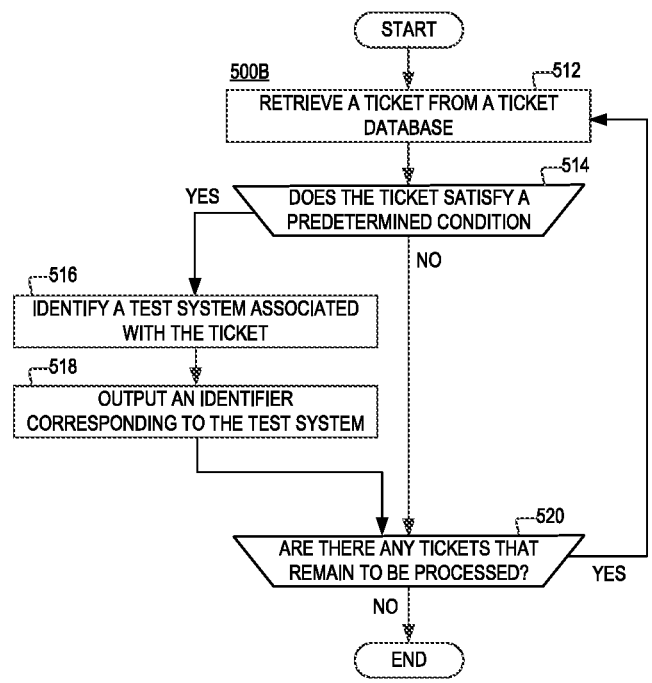
FIG. 5B is a flowchart of an example of a process that is performed by the reclamation agent of FIG. 5A, according to aspects of the disclosure.

FIG. 5B is a flowchart of an example of a process 500B that is performed by the reclamation agent 214. Although in the example of FIG. 5B, the process 500B is performed by the reclamation agent 214, it will be understood that alternative implementations are possible in which the process 50011 (or portions thereof) is performed by any suitable component of the test manager 110. Stated succinctly, the present disclosure is not limited to any specific implementation of the process 500B.

At step 512, the reclamation agent 214 retrieves a ticket 250 from the ticket database 226. At step 514, the reclamation agent detects whether the ticket 250 satisfies a predetermined condition. Step 514 may be executed in the same or similar way as step 504 of FIG. 5A. At step 516, the reclamation agent 214 identifies the test system 122 that is associated with the ticket 250. At step 518, the reclamation agent 214 outputs an identifier corresponding to test system for presentation to a user. Outputting the identifier may include displaying the identifier on a display device (not shown) or transmitting the identifier over a communications network, etc. At step 520, the reclamation agent 214 detects whether there are any more tickets 250 in the ticket database 226 that remain to be processed. If there are more tickets 250 stored in the ticket database 226 that remain to be processed, the process 5001B returns to step 512. Otherwise, the execution of the process 50 MB ends. In some implementations, the reclamation agent 214 may examine all tickets 250 that are stored in the ticket database 226. According to the example of FIG. 5B, no test systems 122 are returned to the pool 121 by the process 5001B. Rather, the process 500B only outputs identifiers corresponding to test systems 122 that can be returned to the pool 121. The test systems 122, whose identifiers are output, may be returned to the pool 121 manually, after the execution of the process 500B is completed.

Figure 5C:
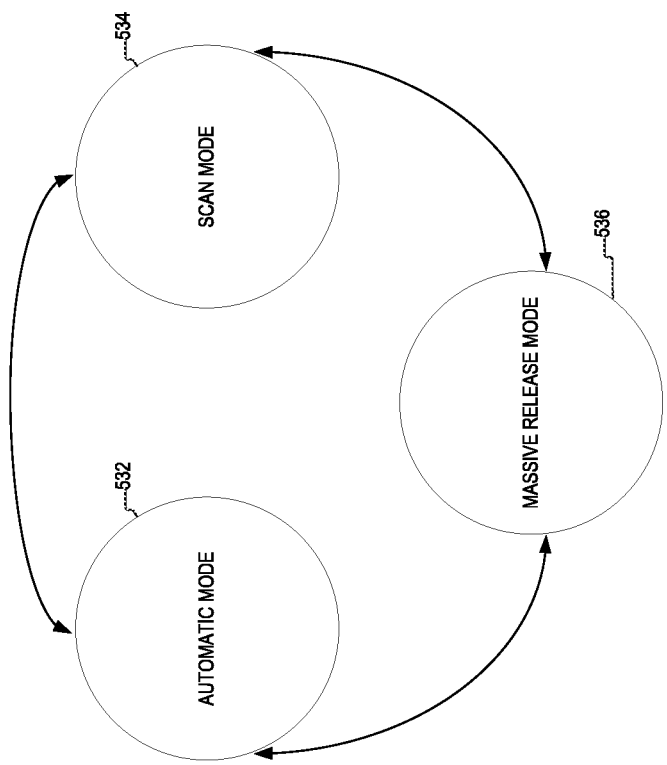
FIG. 5C is a state diagram illustrating the operation of the reclamation agent of FIGS. 5A-B, according to aspects of the disclosure.

FIG. 5C is a state diagram illustrating aspects of the operation of the reclamation agent 214. According to the example of FIG. 5C, the reclamation agent 214 may operate in one of an automatic mode 532, a scan mode 534, and a massive release mode 536. When the reclamation agent 214 is operating in automatic mode 532, the reclamation agent 214 may execute the process 500A, which is discussed above with respect to FIG. 5A. In other words, when the reclamation agent 214 is operating in the automatic mode 532, the reclamation agent 214 may automatically return test systems 122 to the pool 121 (without the provision of additional user input). By contrast, when the reclamation agent 214 is operating in the scan mode 534, the reclamation agent 214 may execute the process 500B, which is discussed above with respect to FIG. 5B. In other words, when the reclamation agent 214 is operating in the scan mode 534, the reclamation agent 214 may display (or otherwise output) identifiers corresponding to the test systems 122 that are associated with tickets that satisfy the predetermined condition (discussed with respect to steps 504 and 514), and leave it up to the user to decide whether they want to return the identified test systems 122 back to the pool 121. When the reclamation agent 214 is operating in massive release mode 536, the reclamation agent 214 may return to the pool 121 all test systems 122 that are associated with tickets 250 (that are stored in the ticket database 226), irrespective of whether these tickets satisfy the predetermined condition (discussed with respect to steps 504 and 514). In some implementations, the operational mode of the reclamation agent 214 may be specified by user input (e.g., a keyboard or a mouse input) that is received at the test manager 110. For instance, if the user input has a first value, the test manager 110 may configure the reclamation agent 214 to execute periodically in the automatic mode 532; if the user input has a second value, the test manager 110 may configure the reclamation agent 214 to execute periodically in the scan mode 534; and if the user input has a third value, the test manager 110 may configure the reclamation agent 214 to execute periodically in the massive release mode 536.

Figure 6:
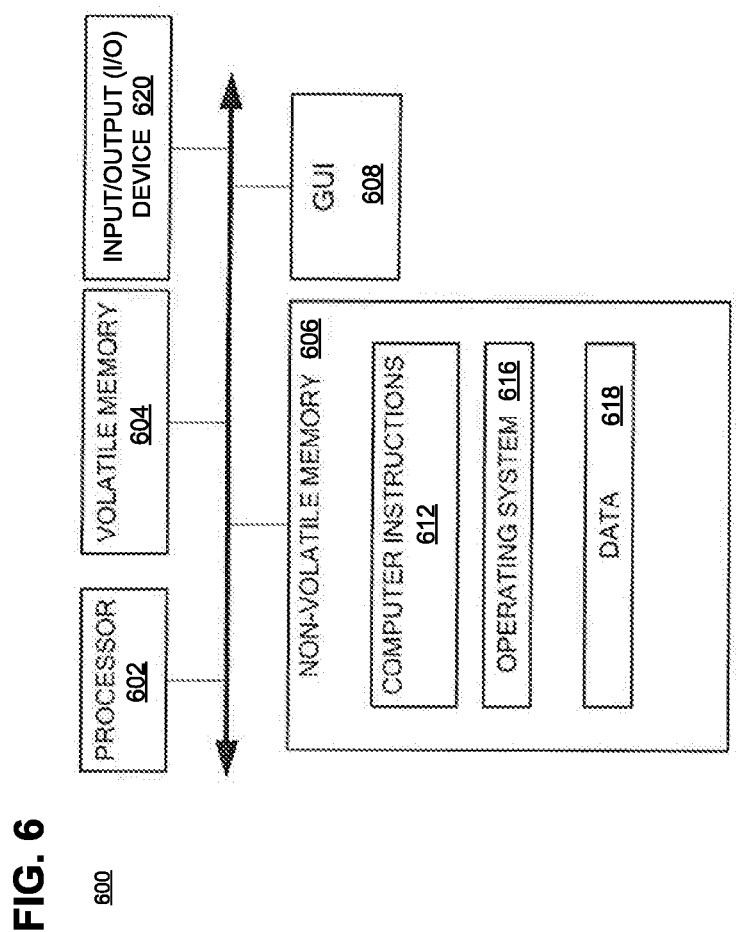
FIG. 6 is a diagram of an example of a computing device, according to aspects of the disclosure.

Referring to FIG. 6, computing device 600 may include processor 602, volatile memory 604 (e.g., RAM), non-volatile memory 606 (e.g., a hard disk drive, a solid-state drive such as a flash drive, a hybrid magnetic and solid-state drive, etc.), graphical user interface (GUI) 608 (e.g., a touchscreen, a display, and so forth) and input/output (I/O)

device 620 (e.g., a mouse, a keyboard, etc.). Non-volatile memory 606 stores computer instructions 612, an operating system 616 and data 618 such that, for example, the computer instructions 612 are executed by the processor 602 out of volatile memory 604. Program code may be applied to data entered using an input device of GUI 608 or received from I/O device 620.

Processor 602 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

FIGS. 1-6 are provided as an example only. At least some of the steps discussed with respect to FIGS. 1-6 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. Although in the example of FIGS. 1-6, the reclamation agent 214 and the allocation agent 212 are depicted as separate entities, in some implementations they may be integrated together. The present disclosure is not limited to any specific definition for what it means for a ticket to be resolved. For example, in some implementations, a ticket may be resolved if the cause of the error associated with the ticket has been discovered. As another example, the ticket may be resolved if an attempt is made to find the error, etc.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected." etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims. (final)

The invention claimed is:

1. A method comprising:
storing one or more tickets in a ticket database, each of the tickets being associated with a corresponding test system, and each of the tickets being associated with an error that is generated as a result of executing one of a plurality of tests on the ticket's corresponding test system; and
executing a reclamation agent that is configured to: retrieve a plurality of tickets from a ticket database, detect if each of the tickets satisfies a predetermined condition, and return the ticket's corresponding test system to a pool of available test systems when the predetermined condition is satisfied by the ticket,
wherein the reclamation agent is configured operate in at least one of a first mode and a second mode, such that: (i) the reclamation agent is configured to return test systems to the pool of available test systems when the reclamation agent is operating in the first mode, and (ii) the reclamation agent is configured to output identifiers corresponding to test systems that are eligible to be returned to the pool of available test systems, when the reclamation agent is operation in the second mode.

2. The method of claim 1, further comprising executing the plurality of tests, wherein executing any of the plurality of tests includes:
selecting a test system from the pool of available test systems;
removing the selected test system from the pool of available test systems; and
executing the test on the selected test system.

3. The method of claim 2, wherein executing any of the plurality of tests further includes:
returning the selected test system to the pool of available test systems when no errors are generated as a result of executing the test; and
leaving the selected test system out of the pool of available systems when one or more errors are generated as a result of executing test, such that the selected test system remains removed from the pool of available systems until the selected test system is returned to the pool of available test systems by the reclamation agent.

4. The method of claim 1, wherein the predetermined condition is satisfied by any of the plurality of tickets when the ticket is resolved.

5. The method of claim 1, wherein the predetermined condition is satisfied by any of the plurality of tickets when the ticket has been stored in the ticket database for longer than a predetermined period.

6. The method of claim 1, wherein the reclamation agent is executed at predetermined time intervals.

7. A system, comprising:
a memory; and
at least one processor operatively coupled to the memory, the at least one processor being configured to perform the operations of:
storing one or more tickets in a ticket database, each of the tickets being associated with a corresponding test system, and each of the tickets being associated with an error that is generated as a result of executing one of a plurality of tests on the ticket's corresponding test system; and
executing a reclamation agent that is configured to: retrieve a plurality of tickets from a ticket database, detect if each of the tickets satisfies a predetermined condition, and return the ticket's corresponding test system to a pool of available test systems when the predetermined condition is satisfied by the ticket,
wherein the reclamation agent is configured operate in at least one of a first mode and a second mode, such that: (i) the reclamation agent is configured to return test systems to the pool of available test systems when the reclamation agent is operating in the first mode, and (ii) the reclamation agent is configured to output identifiers corresponding to test systems that are eligible to be returned to the pool of available test systems, when the reclamation agent is operating in the second mode.

8. The system of claim 7, wherein the at least one processor is further configured to perform the operation of executing the plurality of tests, and executing any of the plurality of tests includes:
selecting a test system from the pool of available test systems;
removing the selected test system from the pool of available test systems; and
executing the test on the selected test system.

9. The system of claim 8, wherein executing any of the plurality of tests further includes:
returning the selected test system to the pool of available test systems when no errors are generated as a result of executing the test; and
leaving the selected test system out of the pool of available systems when one or more errors are generated as a result of executing test, such that the selected test system remains removed from the pool of available systems until the selected test system is returned to the pool of available test systems by the reclamation agent.

10. The system of claim 7, wherein the predetermined condition is satisfied by any of the plurality of tickets when the ticket is resolved.

11. The system of claim 7, wherein the predetermined condition is satisfied by any of the plurality of tickets when the ticket has been stored in the ticket database for longer than a predetermined period.

12. The system of claim 7, wherein the reclamation agent is executed at predetermined time intervals.

13. A non-transitory computer-readable medium storing one or more processor-executable instructions, which, when executed by at least one processor, cause the at least one processor to perform the operations of:

storing one or more tickets in a ticket database, each of the tickets being associated with a corresponding test system, and each of the tickets being associated with an error that is generated as a result of executing one of a plurality of tests on the ticket's corresponding test system; and executing a reclamation agent that is configured to: retrieve a plurality of tickets from a ticket database, detect if each of the tickets satisfies a predetermined condition, and return the ticket's corresponding test system to a pool of available test systems when the predetermined condition is satisfied by the ticket, wherein the reclamation agent is configured operate in at least one of a first mode and a second mode, such that: (i) the reclamation agent is configured to return test systems to the pool of available test systems when the reclamation agent is operation inn the first mode, and (ii) the reclamation agent is configured to output identifiers corresponding to test systems that are eligible to be returned to the pool of available test systems, when the reclamation agent is operating in the second mode.

14. The non-transitory computer-readable medium of claim 13, wherein the one or more processor-executable instructions further cause the at least one processor to perform the operation of executing the plurality of tests, and executing any of the plurality of tests includes:

selecting a test system from the pool of available test systems;

removing the selected test system from the pool of available test systems; and executing the test on the selected test system.

15. The non-transitory computer-readable medium of claim 14, wherein executing any of the plurality of tests further includes:

returning the selected test system to the pool of available test systems when no errors are generated as a result of executing the test; and leaving the selected test system out of the pool of available systems when one or more errors are generated as a result of executing test, such that the selected test system remains removed from the pool of available systems until the selected test system is returned to the pool of available test systems by the reclamation agent.

16. The non-transitory computer-readable medium of claim 13, wherein the predetermined condition is satisfied by any of the plurality of tickets when the ticket is resolved.

17. The non-transitory computer-readable medium of claim 13, wherein the predetermined condition is satisfied by any of the plurality of tickets when the ticket has been stored in the ticket database for longer than a predetermined period.

* * * * *